(No Model.)

J. T. VAN GESTEL.
ELECTRIC BATTERY.

No. 451,142. Patented Apr. 28, 1891.

Witnesses:
O. V. Cushman.
Thomas Durant.

Inventor:
Jean Theodore van Gestel,
by Church & Church
His Attys.

UNITED STATES PATENT OFFICE.

JEAN THEODORE VAN GESTEL, OF NEW YORK, N. Y., ASSIGNOR TO THE CROSBY ELECTRIC COMPANY, OF SAME PLACE.

ELECTRIC BATTERY.

SPECIFICATION forming part of Letters Patent No. 451,142, dated April 28, 1891.

Application filed August 29, 1890. Serial No. 363,439. (No model.)

*To all whom it may concern:*

Be it known that I, JEAN THEODORE VAN GESTEL, a native of the Netherlands, now residing at New York city, in the county of New York and State of New York, have invented certain new and useful Improvements in Electric Batteries; and I do hereby declare the following to be a full, clear, and exact description of the same, reference being had to the accompanying drawings, forming a part of this specification, and to the letters of reference marked thereon.

This invention relates to certain improvements in that class of electrical generators known as "primary batteries," and is more especially designed for application to or use in connection with what are known as "dry batteries," in which the excitant is absorbed or held by capillary attraction within a packing—such as sawdust, cotton, wool, &c.—interposed between the positive and negative electrodes; and said invention consists in the novel and improved means employed for reenforcing the action of the positive electrode in a manner to greatly increase the power and capacity of the battery as a generator of electricity, all as hereinafter fully described, and pointed out in the claims.

Figure 1:
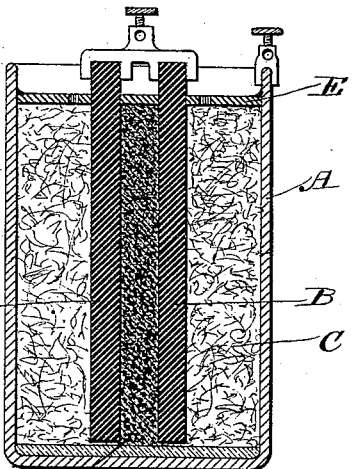
Figure 2:
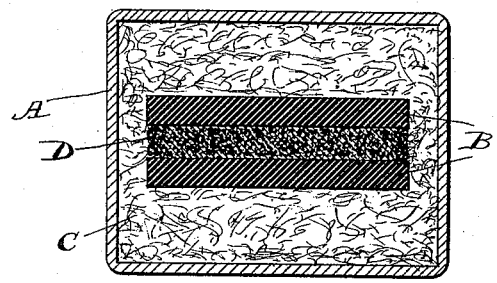
Figure 3:
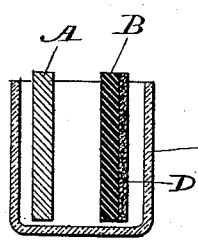
Figure 4:
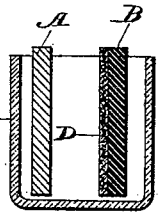

In the accompanying drawings, Figure 1 is a vertical section, and Fig. 2 a transverse section, through a battery containing my improvements, showing one of the best forms in which the invention has been applied. Figs. 3 and 4 are diagrammatic views illustrating modifications in the arrangement.

Similar letters of reference in the several figures indicate the same parts.

In the drawings, which represent conventional or well-known forms of batteries, A designates the negative or zinc electrode, B the positive or carbon electrode, and C the sawdust or other packing containing an excitant, such as sal-ammoniac. The mouth of the cell is closed by a seal E, through which suitable openings are made for the admission of water or other liquids.

In Figs. 1 and 2 the zinc electrode is shown in the form of a cup or jar forming the inclosing case for the battery; but it is evident that the inclosing case may be made of any suitable material and the zinc electrode inserted therein, as is common in many forms of batteries, and as is indicated in Figs. 3 and 4, wherein an inclosing case or receptacle A' separate from the electrode is shown.

The construction, composition, and action of batteries of the class thus far described are well known and do not require special explanation to be understood by those skilled in the art, the parts referred to having been referred to herein merely to illustrate the application of my improvements, which consist, essentially, in the application to or amalgamation with the surface of the positive or carbon electrode B of a coating or layer D, composed in whole or in part of the binoxide of manganese or a salt or salts of manganese.

The coating or layer D is applied in the form of a paint, cement, powder, or otherwise to the surface of the carbon plate B in a manner to produce intimate and close contact therewith, the two surfaces being in effect amalgamated and joined together.

Although the salts of manganese may be used in forming the coating or layer D, I prefer the binoxide, having obtained the best and most marked results with it. In applying the binoxide it may be ground or crushed and mixed with water or other suitable binder, after which it is distributed over and brought intimately in contact with the surface of the carbon; or it may be applied in powdered form to the surface of the carbon and pressed thereon, the liquids of the battery supplying sufficient moisture to cause the coating or layer to preserve its integrity as such on the surface of the carbon.

The best results have thus far been obtained where, as illustrated in Figs. 1 and 2, the battery is provided with two carbon plates or electrodes connected together so as to form in effect a single positive electrode, the space between the plates being filled with a paste of the binoxide of manganese.

The layer, coating, or stratum composed of or containing the binoxide of manganese, a salt of manganese, or combinations of said salts with or without a portion of the binoxide, applied in the manner indicated above, so as to make close contact with the surface of the carbon covered by it, appears to operate as an excitant for the positive electrode, augmenting in a marked degree the quantity of oxygen given off by the positive electrode, so that the neutral point in the battery is brought much nearer the negative electrode, thereby favoring the generation of the current and increasing its intensity.

Whatever the action may be which takes place within the battery, experience has shown that by the addition of my present improvements the power of the battery is greatly augmented and much more beneficial effects are produced than when the layer or stratum D is omitted.

As before stated, the best results are produced when the layer D is interposed between two carbon plates, the uncoated faces of the latter being presented to the negative electrode. So, too, when a single plate or electrode B is employed it is advantageous to apply the coating D on the side or face remote from the negative electrode, as indicated in Fig. 3.

Having thus described my invention, what I claim as new is—

1. In an electric generator such as described, the combination, with the positive or carbon electrode thereof, of a layer or coating of binoxide of manganese or its equivalent applied and united to the surface in the manner and for the purpose specified.

2. The combination, in a battery such as described and with the positive or carbon electrode thereof, of a layer or coating of binoxide of manganese applied to the face of the electrode remote from the negative electrode, substantially as described.

3. The combination, in an electric battery and with the duplex positive electrode thereof, of a layer or stratum containing manganese interposed between the members of said electrode and in intimate contact with the surfaces thereof, substantially as described.

4. In a battery such as described, the combination, with the electrodes A and B and interposed packing C, containing the excitant, of the coating D, spread upon and amalgamated with the surface of the positive electrode B, substantially as described.

JEAN THEODORE VAN GESTEL.

Witnesses:
   W. J. ANDERSON,
   SUMNER C. CHANDLER.